ELECTRO-OPTICAL CONTOUR OUTLINING APPARATUS
Filed April 23, 1954 4 Sheets-Sheet 1
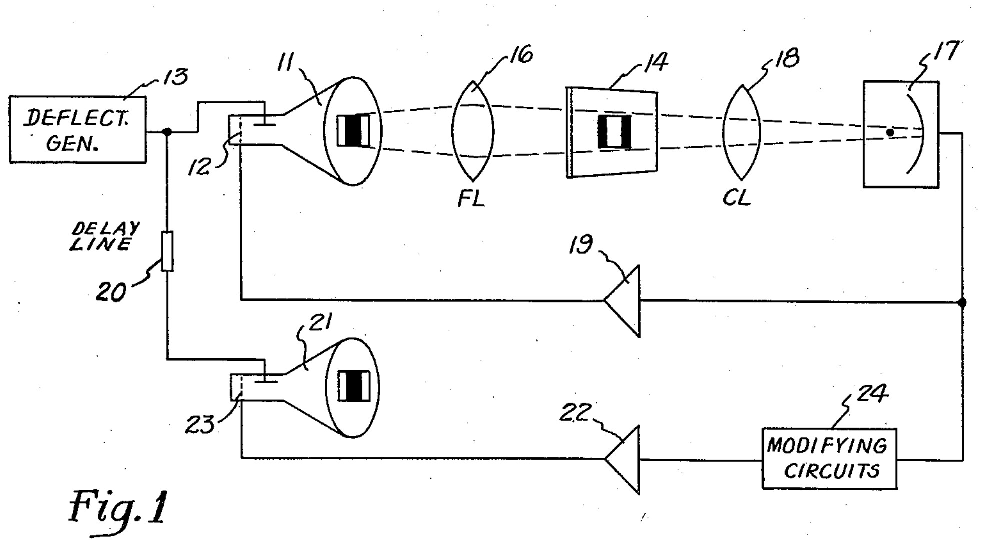
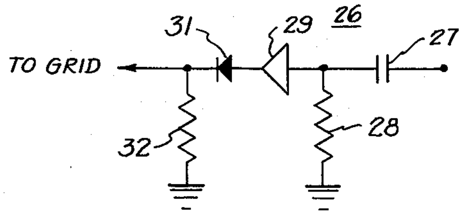
Fig. 2
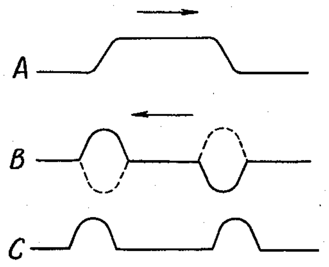
Fig. 3
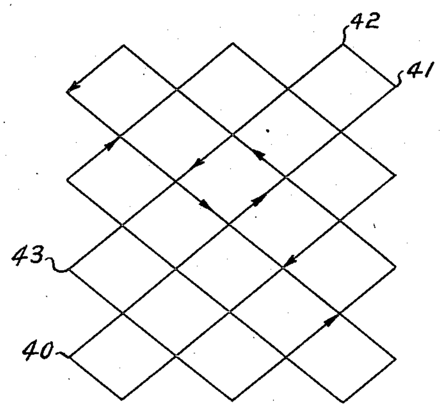
Fig. 4
INVENTOR.
Leslie S. G. Kovasznay
BY
Howard L. Rose
AGENT Aug. 18, 1959 L. S. G. KOVASZNAY 2,900,442
ELECTRO-OPTICAL CONTOUR OUTLINING APPARATUS
Filed April 23, 1954 4 Sheets-Sheet 2
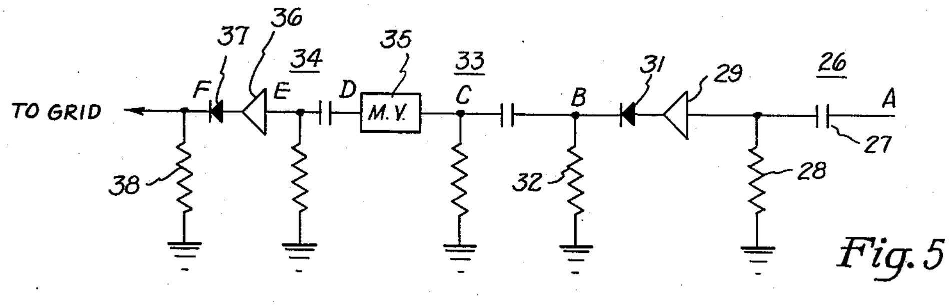
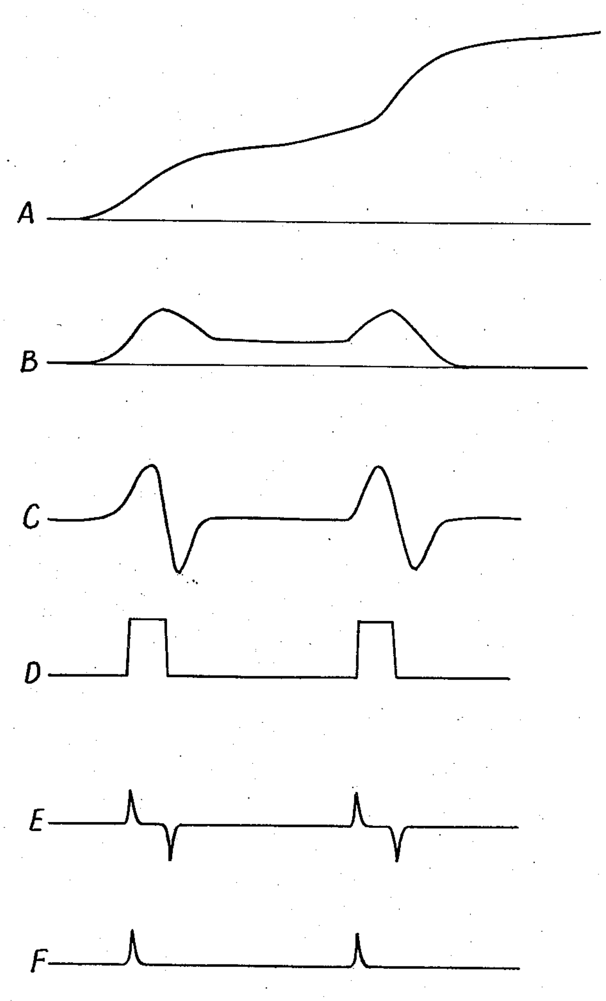
Fig. 6
INVENTOR.
Leslie S. G. Kovasznay
BY
Howard L. Rose
AGENT INVENTOR
Leslie S. G. Kovasznay BY Howard L. Rose
AGENT Aug. 18, 1959 L. S. G. KOVASZNAY 2,900,442

ELECTRO-OPTICAL CONTOUR OUTLINING APPARATUS

Filed April 23, 1954 4 Sheets-Sheet 4

INVENTOR.
Leslie S.G. Kovasznay
BY Arthur Vinograd
Leonard F. Stoll
ATTORNEYS

United States Patent Office 2,900,442

Patented Aug. 18, 1959

2,900,442

ELECTRO-OPTICAL CONTOUR OUTLINING APPARATUS

Leslie S. G. Kovasznay, Baltimore, Md.

Application April 23, 1954, Serial No. 425,334

10 Claims. (Cl. 178—6)

(Granted under Title 35, U.S. Code (1952), sec. 266)

The invention described herein may be manufactured and used by or for the Government of the United States for governmental purposes without the payment to me of any royalty thereon, in accordance with the provisions of title 35, United States Code (1952), section 266.

The present invention relates to a system in which electro-optical techniques are employed to produce electrical signals proportional to the varying optical characteristics of an image which is to be investigated. The electrical signals thus produced are operated upon in accordance with various mathematical functions by appropriate circuitry and then applied to the beam control of a cathode-ray tube to display the new functions. The two-dimensional images which may be represented on a transparency can be handled by established techniques currently in use. A known way of converting a stationary two-dimensional picture into a series of electrical signals is to make use of a flying-spot scanner. Such a system consists of a cathode-ray tube, a picture transparency, a lens for focusing the light from the tube onto the transparency, a light-collecting lens, and a phototube. The luminous spot scans an area on the face of the cathode-ray tube, and the light thus produced is focused on the transparency. The light transmitted through the transparency is focused on the phototube which converts the light variations into electrical signals. The present invention is primarily concerned with modifying the electrical signals, thus produced, in accordance with known mathematical functions so as to make possible the determination of various characteristics of the information carried on the transparency which may not otherwise be obtainable. These modified signals are then displayed on a second cathode-ray tube for further study.

It is an object of the present invention to modify these electrical signals in accordance with known mathematical functions which are responsive to the time variations of the signals. Thus in the present invention if the output of the photocell is differentiated and rectified, the display on the second cathode-ray tube mentioned above is a contour outline of the original picture on the transparency. With such a scheme it is possible to reduce a pattern or picture to some standard recognizable form with a view towards expediting recognition of the pattern or information carried on the transparency.

Another advantage of the invention is to provide for contour outlining of information carried on the transparency in which the degree of detail may be readily controlled or in which several degrees of detail may be obtained from the same signal.

Another object of the invention is to use a novel sweep circuit such that mathematical functions in two-dimensions may be studied. In such a system a scanning method may be used such that the sweep velocity is symmetrical with respect to the horizontal and verticle axes of the tube and the forward velocity has the same magnitude as the return velocity. The use of this type of scan in the present system allows operation upon the electrical signals induced by the phototube by simple electronic circuits without the need of extensive memory systems.

In accordance with one embodiment of the present invention a transparency is scanned by a flying spot scanner and the output of the phototube is differentiated and rectified and applied to the beam intensity grid of a cathode-ray tube. The sweep of this cathode-ray tube is synchronized with the sweep of the cathode-ray tube of the flying spot scanner. The picture display upon the face of the cathode-ray tube has a contour outline of the information carried on the transparency. In an effort to increase the contrast and decrease the response time of the circuits, negative feedback is applied from the output of the phototube to the beam intensity control of the cathode-ray tube in the flying spot scanner. The differentiated signal may be handled in various ways depending upon the type of sweep circuit being used.

Other uses and advantages of the invention will become apparent upon reference to the specification and drawings.

Figure 1 is a schematic diagram of the basic system of the present invention.

Figure 2 shows a circuit which may be used in the modifying circuits of Figure 1.

Figure 3 shows the wave forms produced by the circuit of Figures 1 and 2.

Figure 4 shows a sweep pattern which may be used with the present invention.

Figure 5 is a more elaborate system of the same general type as that shown in Figure 2.

Figure 6 shows the wave forms produced by a more complex pattern than that shown in Figure 3.

Figure 7:
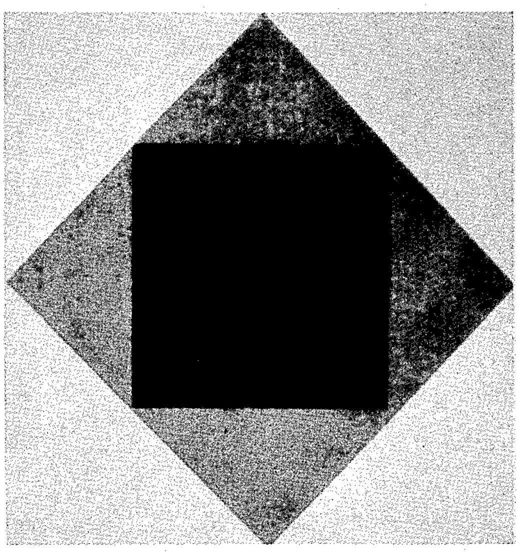
Figure 7 is a reproduction of a photograph made from the face of a cathode-ray tube.

Referring to Figure 1, there is a first cathode-ray tube 11 having a beam intensity control grid 12. The deflection plates of the tube are connected to receive the output of the deflection generator 13. It should be understood that either electrostatic or electromagnetic deflection may be employed. The light on the face of the cathode-ray tube 11 is focused on the transparency 14 by the focusing lens 16. The light passing through the transparency is focused on the photocell 17 by the condensing lens 18. In the preferred embodiment of the present invention, the output of the photocell is fed back through the amplifier 19 to the beam intensity control grid 12 of the cathode-ray tube 11. Improved results are obtained with feedback; however, the system will operate satisfactorily without it. The finite response time of the various elements are suppressed by this negative feedback, especially the delay time of the phosphor. If the feedback is strong and is of a polarity that reduces the spot intensity—in other words, negative feedback—the system tends to minimize the signal output of the phototube and therefore tends to produce a constant light intensity reaching the phototube from each point on the transparency. The result is that for each light or transparent portion on the transparency, the face of the cathode-ray tube is darkened, and vice versa. The picture reproduced on the phototube is therefore a negative and because of the improvement due to negative feedback the contrast range is the same as that of the original. Since the elements 11—14, 16, 17, and 18 must be enclosed in a light-tight system to insure proper operation of the scanner, it is convenient to display the signals produced by the phototube 17 on a monitor scope 21. The sweep pattern of the tube 21 is the same as that on tube 11, both tubes having their sweep circuits connected to the sweep generator 13. A delay line 20 may or may not be inserted in the lead to the tube 21. The output of the phototube is applied through the amplifier 22 to the beam intensity control grid 23 of the monitor tube 21. Modifying circuits 24 may or may not be interposed in the loop to the tube 21. If the modifying circuits are excluded the display on the tube 21 will be identical with that on tube 11, and this is the case as shown in Figure 1. In the system shown in Figure 1 a transparency is used as the image to be scanned. The present invention is equally applicable to systems for scanning opaque images and to television camera systems.

As indicated above various types of modifying circuits may be introduced at 24 to provide a means for operating on the output of the photocell 17 in accordance with known mathematical functions. A circuit for producing contour outlining of the pattern on the transparency is shown in Figure 2. In this system the output of the photocell 17 is fed into the differentiating network 26, which is composed of the capacitor 27 and the resistor 28.

In Figure 3 are shown the results of such an operation upon the signal produced when the transparency shown in Figure 1 is scanned. The output of the photocell is shown as wave form A in Figure 3. When the spot is transversing the dark position of the pattern shown on transparency 14, the light intensity is low and therefore the electrical output of the photocell 17 is at a low level. As the spot progresses from the dark to the light portion, the output of the photocell increases along a sloping wave front to a new intensity. It continues at this level until the spot again reaches a dark position, at which time the signal falls to its original intensity. Since finite times are involved in the transition from light to dark a sloping wave front is produced as represented in wave form A. If this signal is now differentiated in the differentiation network 26 of Figure 2, wave form B is produced. This wave has a position excursion where the slope of wave A is positive and has a negative excursion where the slope is negative. The sign of the excursion at any particular point is dependent upon the direction of the sweep, the wave B being produced when the sweep is from the left to the right (the forward direction) of wave A. If the sweep had been from the right to the left (the reverse direction), wave B would have taken the form shown by the dotted lines. To produce contour outlining of a picture, however, it is necessary to have only positive excursions of the intensity control signal and in the case of the display on the transparency 14 in Figure 1 two positive pips should occur at some time during the sloping portion of the wave A. If the forward sweep only is used, the output of the differentiator 26 should be full-wave rectified before being applied to the grid of the cathode-ray tube 21. It will be noted that if a conventional television type scan had been used in Figure 1, the contour outlining would occur only in the horizontal plane, since the conventional television sweep scans only along the horizontal axis of the tube. By the use of highly complex memory circuits it is conceivable that the horizontal video signals could be compared point by point and differentiated in a vertical plane to produce a similar effect on the vertical axis of the tube. However, as is immediately apparent, such a practice would be highly undesirable because of the complexity of the circuitry.

There are various alternatives to this approach, two of which are: (1) to use the conventional television scan and interchange the horizontal and vertical deflection plates of the tubes periodically so that the tube is swept first horizontally and then vertically, and (2) to use a continuous constant velocity scan. In the first system mentioned above the transparency would be swept only in the forward direction and it would be necessary to provide for full-wave rectification of the output of the differentiator shown in Figure 2. This, of course, is easily done and is no great drawback. However, there is one disadvantage in the use of this type of circuit. It will be noted in Figure 3 that when full-wave rectification is used, the two pulses in wave B have a fixed time relation with respect to each other and to the wave A. Because of the inherent delay in the differentiation circuit of Figure 2 the pulses in B are slightly displaced in time with respect to the wave A. This can be corrected by delaying the sweep to the cathode-ray tube 21 which then corrects for the delay in the differentiation circuits and provides for correct display of information on the tube 21. If such a practice is followed these pulses can be located so that they occur approximately halfway up the rising and falling slopes of the wave A. In many applications such a display is that which is desired. However, when attempting to produce an outline which is most readily recognizable by the human eye, the abovementioned position of the outline does not present a true picture. For some phyiological reasons the outline when observed by the human eye appears truer when these pulses occur closer to the darker regions of the transition, in this case near the bottom of the slopes of wave A. However, since the two pulses of wave B are fixed with respect to each other, this cannot be obtained by using the double television sweep as discussed above. Therefore it was determined that the sweep shown in Figure 4 is the better of the two for this purpose.

The circuits and waves necessary for producing such a sweep are depicted and claimed in copending application Serial No. 362,172, filed by Leslie S. G. Kovasznay on June 16, 1953, now Patent No. 2,817,787, issued Dec. 24, 1957. In this type of sweep, as indicated by the arrows on the graph of Figure 4, each incremental area on the face of the tube is swept in four different directions during each frame. The sweep along opposite sides of each area are parallel but in opposite directions, and it is this part of the sweep shown in this figure that is particularly useful in the systems of the present invention. Since by using this sweep each incremental area on the face of the tube, and therefore on the transparency 14, is swept from opposite directions along each axis of the sweep, both the solid and dotted line waves of Figure 3B are produced.

Figure 9:
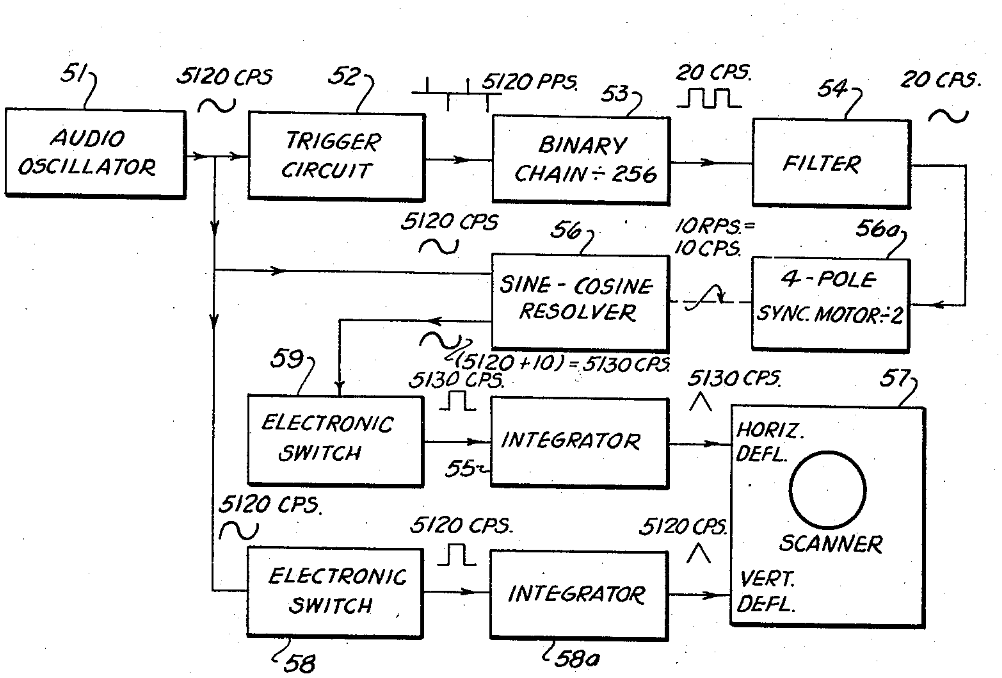
Fig. 9 is a schematic diagram of a circuit for implementing the sweep pattern shown in Fig. 4.

A preferred circuit which will accomplish such constant velocity sweep is illustrated in Fig. 9 which represents the apparatus fully described in the referred-to copending application. For the reasons fully developed in the copending application, it can be shown that if sweep frequencies $f_1$ and $f_2$ having the relation $f_2-f_1=f_1/M$ are applied to the deflecting circuits of a cathode-ray tube then a constant velocity closed loop sweep having a sweep pattern such as is depicted in Fig. 4 of the present case will be evolved. In the above relationship $f_1$ and $f_2$ correspond to the frequencies of the sweep signals separately applied to the horizontal and vertical deflecting mechanisms of a cathode-ray tube and M represents the number of cycles of a basic sweep frequency occurring during each frame.

Referring to Fig. 9, it will be apparent that by generating two triangular waveforms having respective frequencies corresponding to the above relationship, and applying one wave to the vertical deflection plates of a cathode-ray tube and the other wave to the horizontal deflection plates of the tube, a closed loop sweep pattern of the type shown in Fig. 4 will be achieved. Specifically, a master audio oscillator 51 is employed which generates a sine wave having a frequency corresponding to $f_1$. By way of example, such frequency may be 5120 c.p.s., this value being chosen merely for the purposes of illustration. The signal from audio oscillator 51 is applied simultaneously to a trigger circuit 52, a sine co-sine resolver mechanism 58 and to an electronic switch 58. Trigger circuit 52 provides a sharpened pulse output having a repetition frequency of 5120 c.p.s. The pulse output obtained from trigger circuit 52 is indicated along side the block in Fig. 9. The output pulses from trigger circuit 52 are applied to a binary chain 53 which divides the input pulses by a factor of 256 and provides an output pulse which comprises a 20-cycle per second square wave which is indicated in Fig. 9. Such signal is then fed to a filter circuit 54 which converts the square wave into a sine wave having a 20-c.p.s rate. The 20-c.p.s sine wave signal energizes a four-pole synchronous motor 56*a* which divides the applied frequency by 2. The rotation of the output shaft of motor 56*a* therefore has a rate of 10 c.p.s. The shaft of the motor 56*a* drives a sine-cosine resolver 56 which is also energized by the output of audio oscillator 51 as previously indicated. The 5120 c.p.s. signal from the oscillator 51 and the 10 c.p.s displacement introduced into the resolver by the motor 56*a* are combined to produce an output sine wave having a frequency of 5130 c.p.s. Such output is fed to an electronic switch 59 which functions to convert the applied sine wave into a square wave of like repetition frequency. The square wave in turn is fed into an integrator 55 which converts the square waves into triangular waves having a frequency of 5130 c.p.s. These triangular waves are fed to one set of a deflection plate such as the horizontal deflection plates of the cathode-ray tube 57.

Figure 10:
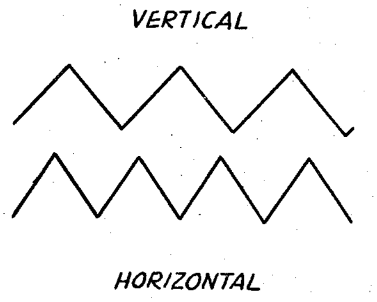
Fig. 10 shows the waveforms produced by the apparatus of Fig. 9.

Since electronic switch 58 is also connected to the output of audio oscillator 51, its output will be a rectangular wave having a repetition frequency of 5120 c.p.s. Such signal when applied to integrator 58*a* is converted into a triangular wave having a like frequency of 5120 c.p.s. The output of the integrator is applied to the other (vertical) deflection mechanism of the cathode-ray tube apparatus. It will be apparent that if the triangular wave signals from each of the integrators 55, 58*a* correspond to the frequencies $f_1$ and $f_2$ indicated in the above equation, then the frequency $f_2$ is displaced from the $f_1$ frequency by a given ratio, and the ratio of $f_1$ to $f_2$ remains constant regardless of variations of the frequency $f_1$, within reasonable limits. The sweep signals applied to the horizontal and vertical deflection mechanisms of the cathode-ray tube are indicated in Fig. 10. The difference in frequencies between the two signals is apparent from Fig. 10. When such signals are applied to the cathode-ray tube deflection mechanism, the resulting deflection of the cathode-ray will result in a trace pattern corresponding to that indicated in Fig. 4. That is, referring to Fig. 4, the sweep starts at the point 40 proceeds to point 41, to points 42 and 43 and so on as indicated by the arrows in Fig. 4.

By using half-wave rectification of the output of the photocell 17, two pulses are obtained which by the use of delays in the sweep circuits can be made to occur in any desired relation within reason, to the picture display on the face of the cathode-ray tube 11. If the sweep of the tube 21 is delayed sufficiently the first positive pulse of wave B will occur very close to the bottom of the sloping portion of the wave A. Now, since the other pulse is written during the sweep in the opposite direction, the delay in the sweep will have the same effect upon the positioning of the other pulse as it does upon the positioning of the first pulse, and therefore both pulses will appear towards the bottom of the sloping portions of the wave A, shown in Figure 3.

A sweep pattern which will give results somewhat similar to those obtained by the sweep of Figure 4 can be achieved by switching a television sweep pattern through 360 degrees in 90 degree steps. In this way each incremental area will be swept vertically both up and down and horizontally from left to right and vice versa. It is apparent from this that any sweep may be used which sweeps the screen from two mutually perpendicular directions at the same velocity during each picture frame.

Referring again to Figure 2, the output of the differentiator is amplified by amplifier 29 and half-wave rectified by the rectifier 31, this system being appropriate for use with the type of sweep shown in Figure 4. If a television sweep is to be used full-wave rectification would be employed instead. The signal after passing through the rectifier 31 is developed across resistor 32 and then applied to the amplifier 22 of Figure 1.

The somewhat simple circuit of Figure 2 is readily usable with signals of the type shown in Figure 3 in which there is a rise from one level to a second level and then a return to the original level. In such a situation the output of the modifying circuit will be, as shown at C in Figure 3, one or more pulses of the same amplitude. As a result it is a simple matter to recognize the desired information and eliminate noise and other low amplitude effects. This is easily done by adjusting the cut off level of the tubes in the amplifiers so as to pass only the tops of the pulses.

In a system in which the transparency contains many levels of contrast as demonstrated by waveform A in Fig. 6 many pulses of varying amplitude will be produced by the differentiator and a more reliable means for accepting and rejecting pulses of varying magnitude must be employed.

The actual magnitude of the signal A of Figure 6 is not a reliable criterion upon which to base outlining, since changes in character of the picture are indicated by changes in the slope of the signal and not its magnitude. Therefore if one were to attempt to use the wave B to determine when or when not to vary beam intensity, a circuit dependent upon the magnitude of B would have to be used. If the recognition level was, for example, set at the level of the line between the two pulses of wave B, then small rapid changes which, however, did not produce a pulse of a magnitude as large as the line mentioned above would be lost. This would result in the loss of a great deal of outlining information. If, however, signal B is differentiated, the wave C is produced, which it will be noted goes through zero at the end of each pulse of wave B. Therefore a zero voltage cutoff level may be used without changing the character of the picture outline.

A circuit which produces and utilizes this second differential is shown in Figure 5. The elements 26—32 are the same as those shown in Figure 2, thus producing the wave B in Figure 6. The output of the rectifier 31 is applied to a second differentiating circuit 33 which in effect produces the second differential of the output of the photocell 17. This wave is shown at C in Figure 6 and it can be seen that this output is the same with respect to positive pulses as the output from the circuit of Figure 2 under ideal conditions. The wave C is then fed to a Schmitt-type direct-current cathode coupled multivibrator 35 which produces a square wave output for each positive excursion of the wave form C. In this embodiment the Schmitt-type multivibrator 35 responds to a positive excursion of the wave form C and is reset by the negative excursion of the wave and then must wait for another positive excursion to produce an output. Since the differential of wave form B produces positive pips only during positive excursions of the wave B, the necessity for recognizing marginal voltage levels or pulses is eliminated, multivibrator 35 need only recognize positive excursions of the applied wave.

The output of the multivibrator is differentiated in the circuit 34 thereby producing wave form E. This output is amplified in the amplifier 36 and may or may not be inverted depending upon which pip it is desired to use to produce the contour outline. In the modification shown the signal is not inverted, since this produces a positive pip which occurs approximately at the beginning of the rapid rise in the slope of wave form A. This conforms to the preferred performance set forth in discussing Figures 2, 3, and 4 above. The output of the amplifier 36 is applied through the rectifier 37 to the grid of the tube 21, the signal being developed across the resistor 38.

The amount of information represented in the final outline depends upon the time constant of the differentiating circuit and therefore may be varied to suit a given situation. For instance in Figure 6 a pulse could be produced for the least slowly rising portion of Figure 6A between the two fast rising portions for which pulses were actually produced in Figure 6B. Also it may often be desirable to use two differentiating circuits 26 having different time constants and then either recombining the signals at the grid of the tube 21 or supplying the signals to two different cathode-ray tubes. In this manner greater detail can be obtained than if a single network is used, since if just one differentiating circuit with a very short time constant were used, much of the shading changes in the outlining itself would be lost.

Figure 7 is a reproduction of a photograph taken from the face of the cathode-ray tube 21 when the modifying circuits 24 were not used.

Figure 8:
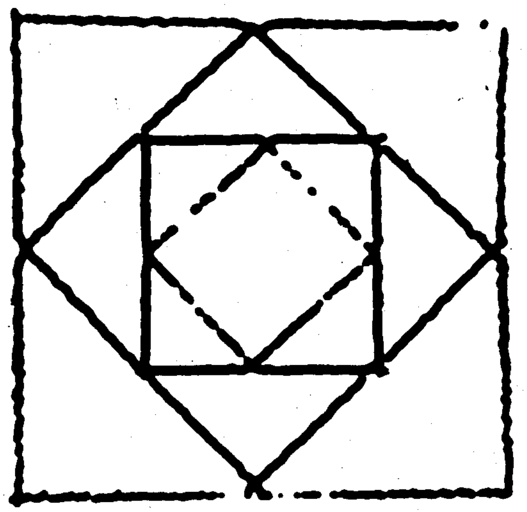
Figure 8 is a photograph of the contour outline produced by the present invention.

Figure 8 is a picture taken from the face of the tube 21 when the circuits according to Figure 5 were used and contour outlining was obtained. It will be noted that although shading of the picture has been eliminated, all of the essential features are represented in line form. The time constant of the differentiating network 26 for this picture was chosen to cause only the most essential features to be outlined.

It will be apparent that the embodiments shown are only exemplary and that various modifications can be made in construction and arrangement within the scope of my invention as defined in the appended claims.

What is claimed is:

1. An electro-optical system, comprising a first cathode-ray tube, sweep means for causing the electron beam of said tube to move in the horizontal and vertical directions at the same constant velocity during each frame, an optical image, means for causing the light from said tube to sweep said image, a photoelectric means, means for focusing the light from said image on said photoelectric means, means for differentiating the output of said photoelectric means, means for rectifying the differentiated signal, a second cathode-ray tube, means for connecting the deflection circuits of said second tube to said sweep means, and means for applying the rectified signal to the control grid of said second cathode-ray tube.

2. The invention according to claim 1 in which means are provided for delaying the sweep to said second cathode-ray tube by a predetermined amount.

3. An electro-optical system comprising means for scanning an image with a predetermined sweep pattern, means responsive to the scanning means for producing electrical signals representative of the image, means responsive to the time variations of said signals to modify the signals according to a predetermined mathematical function, a light source, means for scanning said light source in synchronism with and in accordance with the sweep applied to said image, means for varying the intensity of said light source in accordance with the output of the modifying means, said means for scanning including means for sweeping each of the increment areas of said image from at least two different directions during each scanning frame.

4. The invention according to claim 3 in which said means for modifying the signals according to a predetermined mathematical function are differentiating and rectifying circuits.

5. An electro-optical system for contour outlining of an image comprising means for scanning said image with a flying spot of light from two mutually perpendicular directions during each frame, a photoelectric means, means for directing the light from said image to said photoelectric means so as to produce electric signals which are representative of said image, means for differentiating the electric signals, means for rectifying the differentiated signals, a cathode-ray tube, the deflection circuits for said cathode-ray tube being connected to said means for scanning and means for applying the rectified signal to the control grid of said cathode-ray tube.

6. The invention according to claim 5 in which said means for rectifying is a full-wave rectifier.

7. The invention according to claim 5 in which the means for scanning sweeps each incremental area of said tube from four different directions, the sweep along opposite sides of the area being parallel and in opposite directions.

8. The invention according to claim 7 in which said means for rectifying is a half-wave rectifier.

9. The invention according to claim 8 including a predetermined electrical delay means inserted between the deflection circuits of said cathode ray tube and said means for scanning.

10. The invention according to claim 9 in which said means for scanning includes a second cathode-ray tube and means for connecting the output of said photoelectric means to the control grid of said photoelectric means to the control grid of said second cathode-ray tube.

References Cited in the file of this patent

UNITED STATES PATENTS

| | | |
|---|---|---|
| 1,839,706 | Silberstein | Jan. 5, 1932 |
| 2,138,577 | Gray | Nov. 29, 1938 |
| 2,480,423 | Simmon | Aug. 30, 1949 |
| 2,480,424 | Simmon | Aug. 30, 1949 |
| 2,678,964 | Loughlin | May 18, 1954 |
| 2,804,498 | Theile | Aug. 27, 1957 |